US007751810B1

(12) United States Patent
Bernoske et al.

(10) Patent No.: US 7,751,810 B1
(45) Date of Patent: Jul. 6, 2010

(54) SYSTEM AND METHOD FOR TRANSMITTING INFORMATION TO SUBSCRIBER COMMUNICATION UNITS AT EVENTS

(75) Inventors: Daniel Thomas Bernoske, Washington, DC (US); Frank Celentano, Damascus, MD (US)

(73) Assignee: Nextel Communications Inc., Reston, VA (US)

( * ) Notice: Subject to any disclaimer, the term of this patent is extended or adjusted under 35 U.S.C. 154(b) by 970 days.

(21) Appl. No.: 11/385,394

(22) Filed: Mar. 21, 2006

(51) Int. Cl.
*H04M 3/00* (2006.01)
(52) U.S. Cl. .................. 455/419; 455/420; 455/41.2
(58) Field of Classification Search ......... 455/418–420, 455/403, 41.2, 41.3, 3.01, 414.1, 566
See application file for complete search history.

(56) References Cited

U.S. PATENT DOCUMENTS

| 5,086,389 | A | 2/1992 | Hassett et al. |
| 5,144,553 | A | 9/1992 | Hassett et al. |
| 7,274,909 | B2 * | 9/2007 | Perttila et al. .............. 455/41.2 |
| 7,512,401 | B2 * | 3/2009 | Muhonen et al. ......... 455/414.1 |
| 2004/0203944 | A1 * | 10/2004 | Huomo et al. .............. 455/466 |
| 2006/0148528 | A1 * | 7/2006 | Jung et al. .................. 455/566 |
| 2006/0160517 | A1 * | 7/2006 | Yoon .......................... 455/299 |
| 2006/0229027 | A1 * | 10/2006 | Wang et al. .................... 455/73 |
| 2006/0258289 | A1 * | 11/2006 | Dua ........................... 455/41.3 |
| 2006/0277467 | A1 * | 12/2006 | Reponen et al. ............. 715/708 |
| 2007/0095892 | A1 * | 5/2007 | Lyons et al. ................. 235/379 |
| 2007/0155306 | A1 * | 7/2007 | Koli et al. .................. 455/3.01 |
| 2007/0225047 | A1 * | 9/2007 | Bakos ........................ 455/566 |

OTHER PUBLICATIONS

Want, Roy, "RFID A Key to Automating Everything", Scientific American, Inc., Copyright 2003, pp. 56-65.

* cited by examiner

*Primary Examiner*—CongVan Tran

(57) ABSTRACT

A system and method of transmitting multimedia data related to an event to the wireless communication units of the event attendees. The multimedia data may be broadcasted on a plurality of channels. For example, multimedia data generated from different cameras across the event venue may be placed on multiple channels. Attendees using mobile communication units may tune to any channel in order to view the event performances from the perspective of the selected camera. Also disclosed is a method of provisioning a mobile communication unit for receiving wireless communication services at an event. In this regard, a user purchases or rents a mobile communication unit containing a unique identifier residing in a radio frequency identification (RFID) tag. The user also purchases for receiving wireless communication services for a particular event. A provisioning device at the event venue reads the identifier from the RFID tag to provision the mobile communication unit for receiving wireless communication services.

20 Claims, 4 Drawing Sheets

SYSTEM AND METHOD FOR TRANSMITTING INFORMATION TO SUBSCRIBER COMMUNICATION UNITS AT EVENTS

FIELD OF THE INVENTION

This invention relates generally to wireless communication systems, and in particular, to a system and method for transmitting information to subscriber communication units at events.

BACKGROUND OF THE INVENTION

Large events, such as concerts, sports events, conferences, trade shows, political conventions, etc., are typically attended by a large number of people. Because of the large attendance, venues hosting such events tend to be relatively large. Accordingly, many attendees of these events generally have relatively poor view of the event performances. Many venue operators have recognized this by incorporating one or more large screens that display the events performances. These one or more large screens are typically located and oriented in the venue in a manner that facilitates their viewing by many, if not most, of the attendees to the event.

One drawback of large screens is that the attendees are limited to viewing whatever is being shown, which is typically dictated by someone in a control booth. There could be situations where an attendee would like to view the event performance from a different perspective than that shown in the one or more large screens. For example, in an automobile race, an attendee may want to view the race from the perspective of a particular racing car. Or another example, an attendee may want to view a particular band member, such as the drummer, in a musical concert event.

Multimedia data generated by one or more cameras may be sent to attendees via macro wireless communication systems provided by service providers. However, the amount of multimedia data generated for broadcasting event performances will generally be relatively large. Accordingly, the processing and transmission of such large amount of multimedia data will tend to consume too many network resources of macro wireless communication systems provided by service providers.

As discussed in more detail below, a more preferred manner of transmitting event multimedia data to attendees is by way of a standalone wireless communication system specifically designed to capture multimedia data of event performances and broadcast the multimedia data to the attendees. Further, there is a need for provisioning attendees' mobile communication units (MU) for receiving the broadcasted multimedia data.

SUMMARY OF THE INVENTION

An aspect of the invention relates to a system and method of transmitting multimedia data related to an event to the mobile communication units (MUs) of the event attendees. The multimedia data may be broadcasted on a plurality of channels. For example, multimedia data generated from different cameras across the event venue may be placed on multiple channels. Attendees using their mobile communication units (MUs) may tune to any channel in order to view the event performance from the perspective of the desired camera.

Another aspect of the invention relates to how to provision mobile communication units (MUs) for receiving wireless communication services at the event. In this regard, a user purchases or rents a mobile communication unit (MU) for the purpose of receiving wireless communication services from events. The user also purchases for receiving wireless communication services for a particular event. The mobile communication unit (MU) used by the attendee includes a radio frequency identification (RFID) tag. A provisioning device including an RFID reader is present at the event venue to provision the mobile communication unit (MU) for receiving wireless communication services by reading the unit's RFID tag.

More specifically, disclosed is a wireless communication system comprising a network; one or more content sources coupled to the network and adapted to generate multimedia data; one or more base stations coupled to the network and adapted to wirelessly broadcast the multimedia data; and a provisioning device adapted to provision mobile communication units (MUs) for receiving the broadcasted multimedia data. In an exemplary embodiment, the provisioning device comprises an RFID reader adapted to read an identifier from an RFID tag present in a mobile communication unit (MU). The provisioning device may be adapted to compare the identifier to provisioning information to determine whether the mobile communication unit (MU) is provisioned to receive the broadcasted multimedia data. In another embodiment, the provisioning device is adapted to send the identifier to a provisioning server for provisioning purposes. If it is determined that the mobile communication unit (MU) is provisioned to receive the broadcasted multimedia data, the provisioning device is adapted to enable the mobile communication unit (MU) to receive the broadcasted multimedia data.

Another aspect of the invention relates to a method of provisioning a mobile communication unit (MU). The method comprises reading an identifier from a mobile communication unit (MU); determining whether the mobile communication unit (MU) is provisioned to receive multimedia data by comparing the identifier to provisioning information; and enabling the mobile communication unit (MU) to receive the broadcasted multimedia data if it is determined that the mobile communication unit (MU) is provisioned to receive the broadcasted multimedia data.

Yet another aspect of the invention relates to a mobile communication unit (MU), comprising an antenna; a receiver adapted to wirelessly receive multimedia data from a wireless communication system by way of the antenna; an output device adapted to output the multimedia data to a user; a device adapted to transmit an identifier to a provisioning device; and an enabling device adapted to enable the receiver to receive the multimedia data on the basis of a signal received from the provisioning device. The enabling device may be further adapted to disable the receiver in response to a timing signal provided by a timer. The mobile communication unit (MU) may further comprise an input device adapted to allow a user to tune the receiver to a desired channel.

Other objects, advantages and novel features of the present invention will become apparent from the following detailed description of the invention when considered in conjunction with the accompanying drawings.

DETAILED DESCRIPTION OF THE EXEMPLARY EMBODIMENTS

Figure 1:
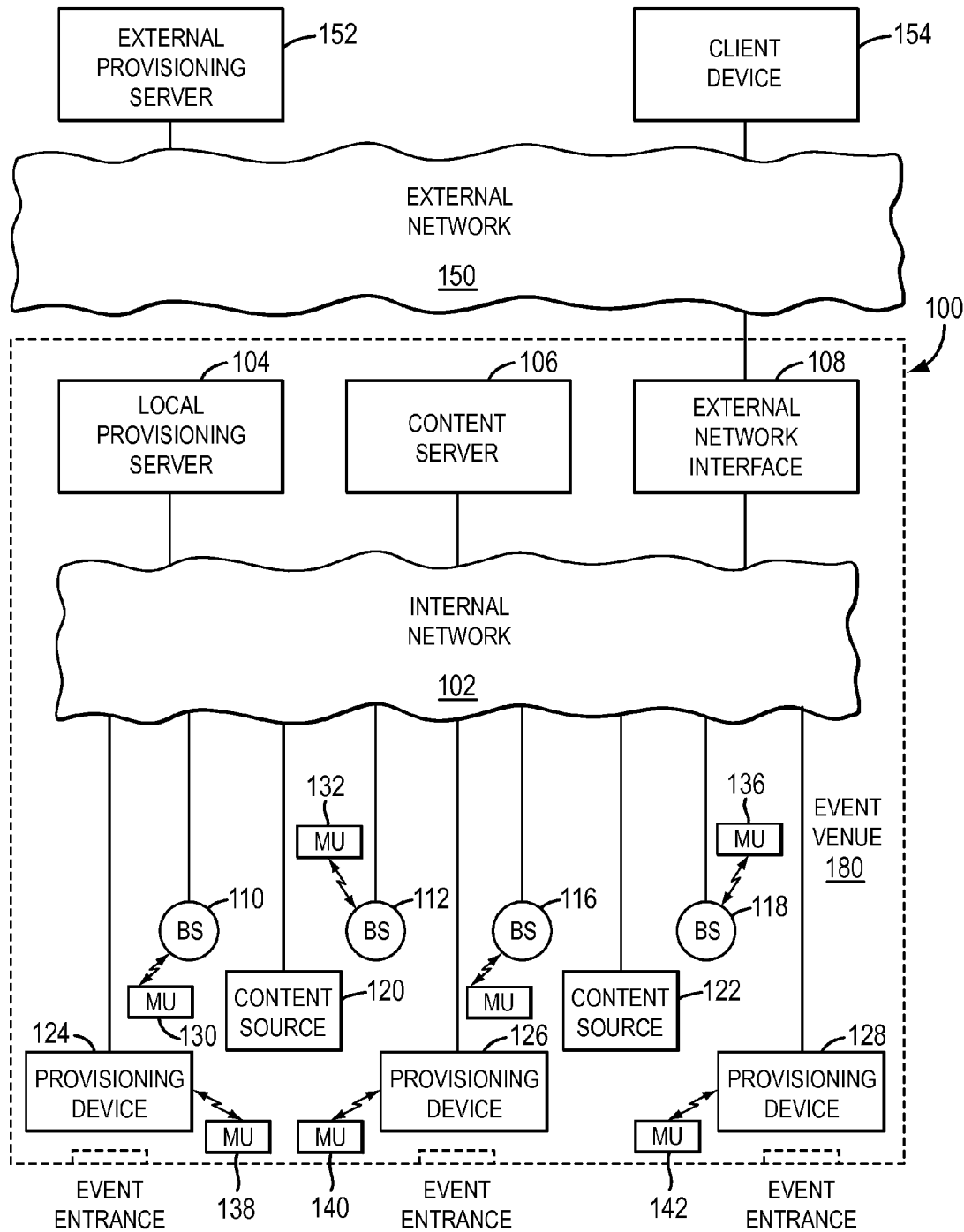
FIG. 1 illustrates a block diagram of an exemplary wireless communication system in accordance with an embodiment of the invention.

FIG. 1 illustrates a block diagram of an exemplary wireless communication system 100 in accordance with an embodiment of the invention. The wireless communication system 100 is particularly suited for transmitting multimedia data to subscribing attendees of a particular event. In this example, the wireless communication system 100 provides multimedia broadcast services to subscribing attendees at event venue 180.

The wireless communication system 100 comprises an internal network 102, a local provisioning server 104, a content server 106, and an external network interface 108. The wireless communication system 100 further comprises one or more base stations (BS), four (4) of which are shown as base stations (BS) 110, 112, 116, and 118; one or more content sources, two (2) of which are shown as content sources 120 and 122; and one or more provisioning devices including radio frequency identification (RFID) readers, three (3) of which are shown as provisioning devices 124, 126, and 128.

As discussed above, the wireless communication system 100 provides event multimedia broadcast services to a plurality of mobile communication units (MUs), seven (7) of which are shown as mobile communication unit (MUs) 130, 132, 134, 136, 138, 140, and 142. In this example, mobile communication units (MUs) 130, 132, 134, and 136 may receive broadcasted multimedia data by way of base stations (BS) 110, 112, 116, and 118, respectively. As discussed in more detail below, the remaining mobile communication units (MUs) 138, 140, and 142 may be undergoing provisioning by communicating respectively with provisioning devices 124, 126, and 128.

The wireless communication system 100 may communicate with external devices, such as an external provisioning server 152, by way of an external network 150. For example, the external network 150 may be a wide area network (WAN), such as the Internet. As discussed in more detail below, a future attendee using a client device 154 may access a website provided by the external provisioning server 152 to purchase or rent a mobile communication unit (MU), as well as to pay for the event multimedia broadcast services provided by the wireless communication system 100.

In more detail, the local provisioning server 104 contains provisioning information related to mobile communication units (MU), whose users have purchased to receive multimedia broadcast service from the wireless communication system 100 for the current event. The local provisioning server 104 may obtain its provisioning data from the external provisioning server 152, which may also contain provisioning data for other events. The local provisioning server 104 may obtain the provisioning data from the external provisioning server 152 by way of the external network interface 108, which provides a network interface between the external network 150 and the internal network 102.

In performing a particular provisioning operation, the local provisioning server 104 receives an identifier pertaining to a mobile communication unit (MU) from one of the provisioning devices, accesses provisioning information stored in a local memory to determine whether the mobile communication unit (MU) identified by the identifier has been provisioned to receive multimedia broadcast services, and sends a signal to the corresponding provisioning device indicating the result of the provisioning operation.

For example, an attendee places his/her mobile communication unit (MU) 138 proximate the provisioning device 124. The provisioning device 124 reads the identifier stored in an RFID tag in the mobile communication unit (MU) 138. The provisioning device 124 sends the identifier to the local provisioning server 104 by way of the internal network 102. The local provisioning server 104 performs the provisioning operation, and sends a message back to the provisioning device 124 indicating the result of the provisioning operation. If the result is that the mobile communication unit (MU) 138 is valid for receiving multimedia broadcast services, the provisioning device 124 transmits a signal to enable the mobile communication unit (MU) 138 to receive the broadcasted multimedia data from the system 100. Otherwise, the provisioning device 124 does not generate the enabling signal, and may visually and/or audibly notify the user that his/her mobile communication unit (MU) is not provisioned to receive multimedia broadcast services from the system 100.

It shall be understood that the provisioning information may reside within the provisioning device. In such a case, the local provisioning server 104 may not be needed. Instead, the provisioning device reads the identifier from the mobile communication unit (MU), accesses provisioning information from a local memory, and transmits the enabling signal if it determines that the mobile communication unit (MU) is provisioned to received the multimedia broadcast services of the event. If the provisioning device does not determine that the mobile communication unit (MU) is provisioned to receive the multimedia broadcast services, the provisioning device may inform the user of such.

In yet another embodiment, the provisioning information may reside in the external provisioning server 152. In such a case, the local provisioning server 104 again may not be needed. Instead, the provisioning devices reads the identifier from the mobile communication unit (MU); sends a provisioning request including the identifier to the external provisioning server 152 by way of the internal network 102, external network interface 108, and the external network 150; and receives the provisioning result from the external provisioning server 152 by way of the external network 150, external network interface 108, and internal network 102. If the result is that the mobile communication unit (MU) 138 is valid for receiving multimedia broadcast services, the provisioning device 124 enables the mobile communication unit (MU) 138. Otherwise, the provisioning device 124 does not enable the unit, and may visually and/or audibly notify the user of such.

The content server 106 receives multimedia data from the content sources 120 and 122, configures the multimedia data for transmission via a plurality of channels, and sends the configured multimedia data to the base stations (BS) 110, 112, 116, and 118 for broadcasting into the wireless environment of the event venue 180. In particular, the content sources 120 and 122 may generate video data, audio data, still picture data, and other multimedia data, of the event performance. For example, the content sources 120 and 122 may be may be video cameras, still pictures, microphones and/or other content generating devices. The multimedia data generated by the content sources 120 and 122 is then sent to the content server 106 by way of the internal network 102.

The content server 106 receives the multimedia data from the content sources, and configures the multimedia data for transmission by way of respective channels. The content server 106 may add locally stored content data to any one or more of the channels being transmitted. For example, the locally stored content data may be advertisements, such as commercials. Additionally, the content server 106 may also encrypt the data as well. Once the content server 106 configures the multimedia data into separate channels, the content server 106 sends the data to the one or more base stations (BS) 110, 112, 116, and 118 for transmission to the wireless medium in which the mobile communication units (MUs) reside.

The base stations (BS) may use any one of many modulations schemes to broadcast the multimedia data, including code division multiple access (CDMA), time division multiple access (TDMA), orthogonal frequency division multiplexing (OFDM), etc. Those mobile communication units (MUs) that have already been provisioned to receive the multimedia broadcast services from the wireless communication system 100, such as mobile communication units (MUs) 130, 132, 134 and 136, is able to receive the broadcasted multimedia data. Further, the mobile communication units (MUs) can tune to any of the broadcasted channels.

Figure 2:
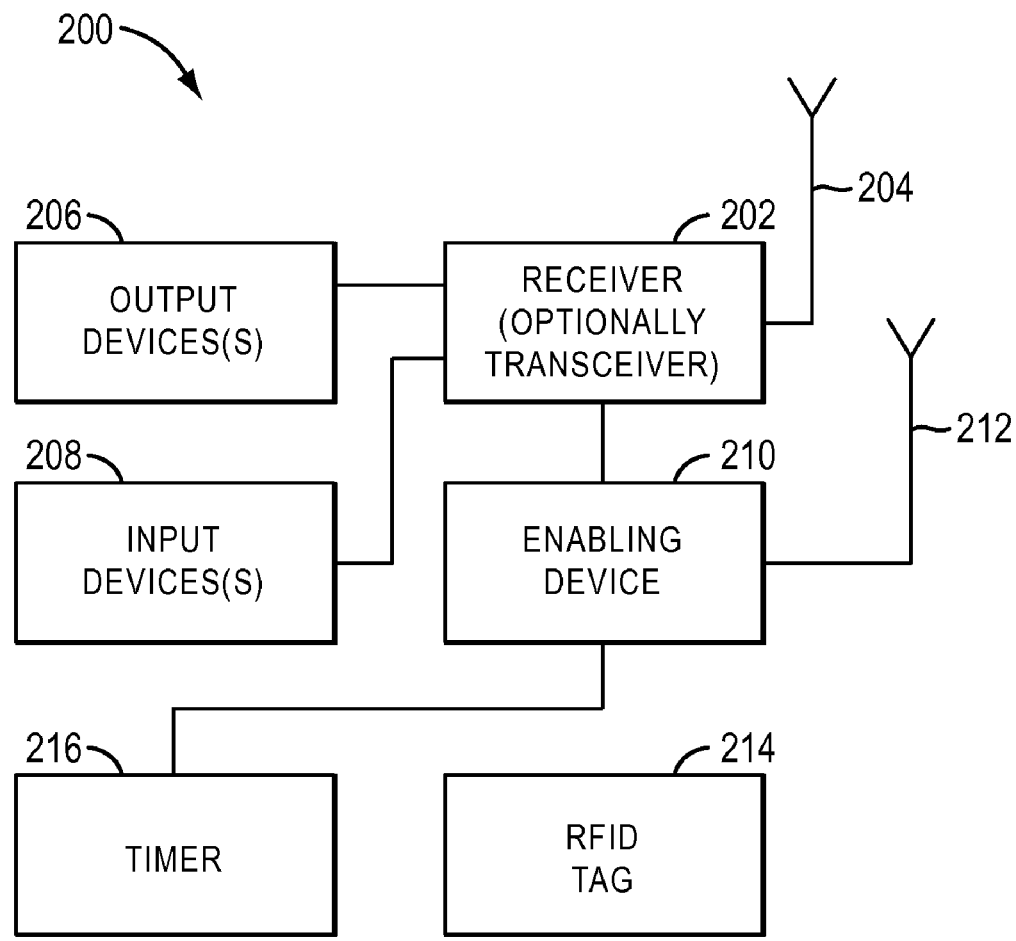
FIG. 2 illustrates a block diagram of an exemplary event mobile communication unit (MU) in accordance with another embodiment of the invention.

FIG. 2 illustrates a block diagram of an exemplary event mobile communication unit (MU) 200 in accordance with another embodiment of the invention. The mobile communication unit (MU) 200 is a detailed example of any one or more of the mobile communication units (MUs) described with respect to the wireless communication system 100. The mobile communication unit (MU) 200 comprises a receiver 202, which may optionally be a transceiver, an antenna 202, one or more output devices 206, one or more input devices 208, an enabling device 210, a corresponding antenna 212 for the enabling device 210 (although antennas 202 and 212 may be one in the same), an RFID tag 214, and a timer 216.

When enabled, the receiver 202 can be tuned to a particular channel and receive multimedia data from the wireless communication system 100 by way of the antenna 204. The receiver 202 delivers the received multimedia data to the one or more output devices 206, which may comprise a display and/or speaker, for viewing and/or hearing by a user of the mobile communication unit (MU) 200. The one or more input devices 208, which may comprise a keyboard, knob, and/or pointing device, allow a user to tune the receiver 202 to a particular channel. The RFID tag 214 receives a signal from one of the provisioning devices, and in response thereto, transmits a signal carrying an identifier associated with the mobile communication unit (MU) 200. As discussed above, the identifier is used by the wireless communication system 100 for provisioning the mobile communication unit (MU) 200.

If the mobile communication unit (MU) 200 is provisioned to receive multimedia broadcast services from the wireless communication system 100, the provisioning device sends out a signal to enable the mobile communication unit (MU) 200 to receive the broadcasted multimedia data. In this regard, the enabling device 210 receives the signal from the provisioning device by way of the antenna 212, and in response, enables the receiver 202 for receiving the broadcasted multimedia data. The enabling of the receiver 202 may be performed in many ways. For example, the enabling device 210 may merely couple the receiver 202 to a battery source. Or, the enabling device 210 may provide the receiver a decryption code to decrypt the multimedia data received from the wireless communication system 100. Or, the enabling device 210 may receive, from the provisioning device, the demodulation codes (e.g., CDMA Walsh codes) used to demodulate the received signal from the wireless communication system 100.

The enabling device 210 may also be programmed to disable the receiver 202 at a predetermined time after the event has ended. The programming may be received from the provisioning device or from an algorithm operating the enabling device 210. The timer 216 may provide the enabling device 210 time and date information for the purpose of disabling the receiver 202 at a predetermined time after the event has ended.

As discussed above, the receiver 202 may optionally be a transceiver. This would allow the mobile communication unit (MU) 200 to send information back to the wireless communication system 100. This may be useful in the case the event request information from its attendees. Such information could be very diverse. For example, the system 100 could ask the attendees to vote on which team or player is going to win the competition. Or, the system 100 could ask the attendees to provide information related to advertisements. Such information could be useful to the event provider, event participants, third party advertisers, and/or other entities.

Figure 3:
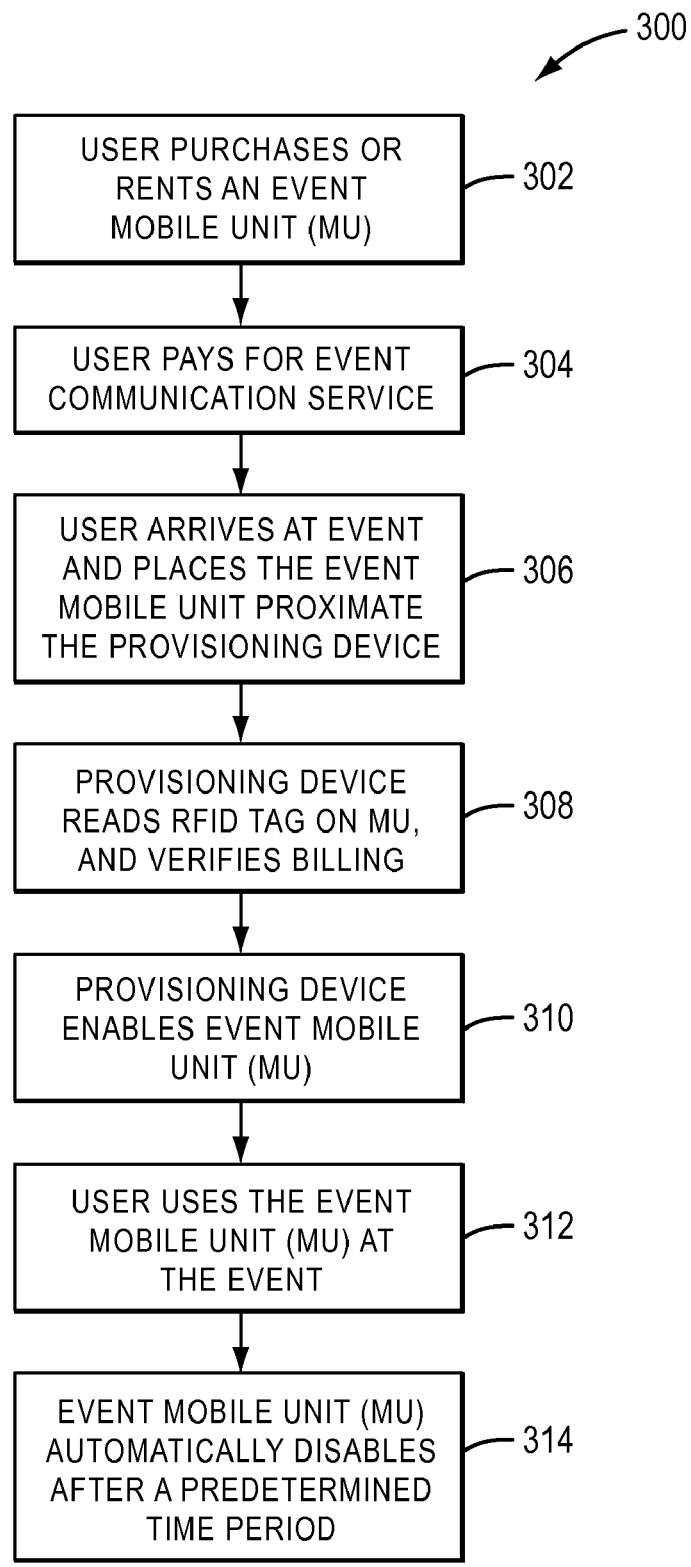
FIG. 3 illustrates a flow diagram of an exemplary method of successfully provisioning an event mobile communication unit (MU) in accordance with another embodiment of the invention.

FIG. 3 illustrates a flow diagram of an exemplary method 300 of successfully provisioning an event mobile communication unit (MU) in accordance with another embodiment of the invention. According to the method 300, a user purchases or rents an event mobile communication unit (MU) (block 302). This may be accomplished in many ways. For example, with reference to FIG. 1, the user using the client device 154 may purchase or rent the unit via a website provided by the external provisioning server 152 or other server. Or, the user may purchase or rent the mobile communication unit (MU) from a retail outlet.

After the user purchases or rents the mobile communication unit (MU), the user pays for the event communication service (block 304). Again, this may be accomplished in numerous ways. For example, with reference to FIG. 1, the user using the client device 154 may purchase for the event communication service via a website provided by the external provisioning server 152 or other server. Or, the user may purchase for the event communication service from a ticket agency, the venue operator, the event provider, or any other entity.

After the user has purchased for the event communication service, the user arrives at the event venue and places the mobile communication unit (MU) proximate the provisioning device (block 306). The provisioning device reads the identifier from the RFID tag embedded in the mobile communication unit (MU), sends the identifier to the local provisioning server 152 via the internal network 102, and receives the successful provisioning information from the local provisioning server 104 via the internal network 102 (block 308). As previously discussed, it shall be understood that the provisioning information may be stored locally in the provisioning device, eliminating the need for the provisioning device to obtain the provisioning information from the local provisioning server 104.

The provisioning device then enables the mobile communication unit (MU) (block 310). The user can now use the mobile communication unit (MU) to receive multimedia broadcast services from the wireless communication system (block 312). After the event has ended, the mobile communication unit (MU) automatically disables itself at a predetermined time (block 314).

Figure 4:
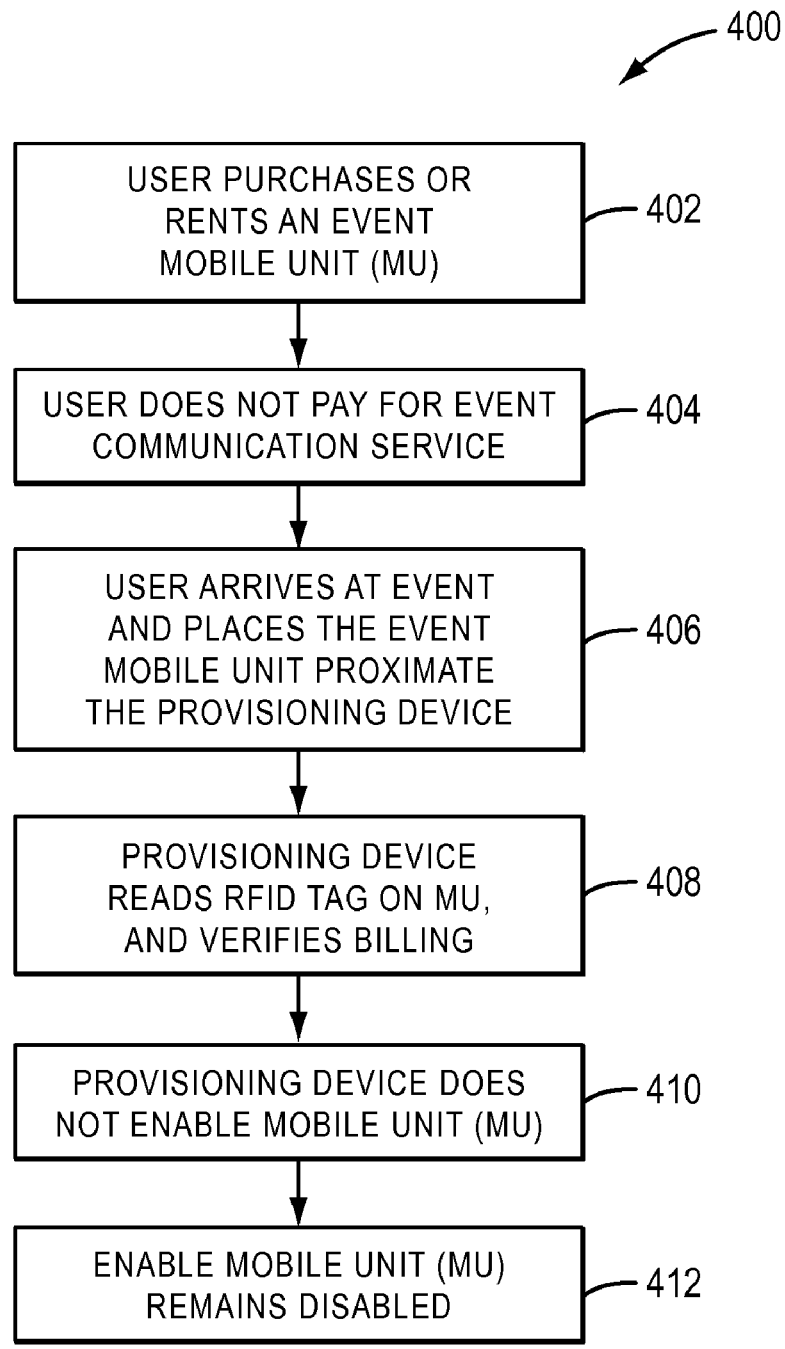
FIG. 4 illustrates a flow diagram of an exemplary method of unsuccessfully provisioning an event mobile communication unit (MU) in accordance with another embodiment of the invention.

FIG. 4 illustrates a flow diagram of an exemplary method 400 of unsuccessfully provisioning an event mobile communication unit (MU) in accordance with another embodiment of the invention. The method 400 is similar to method 300, except that the user does not pay for the event communication service, and, accordingly, the provisioning device does not enable the mobile communication unit (MU). Specifically, according to the method, the user purchases or rents an event mobile communication unit (MU) as previously discussed (block 402). In this case, however, the user does not pay for the event communication service (block 404). Then, the user arrives at the event venue and places the mobile communication unit (MU) proximate the provisioning device (block 406).

The provisioning device reads the identifier from the RFID tag embedded in the mobile communication unit (MU), sends the identifier to the local provisioning server 152 via the internal network 102, and receives the unsuccessful provisioning information from the local provisioning server 104 via the internal network 102 (block 408). As discussed above, the provisioning information may be stored locally in the provisioning device, eliminating the need for the provisioning device to obtain the provisioning information from the local provisioning server 104. Since, in this example, the provisioning was not successful, the provisioning device does not enable the mobile communication unit (MU) (block 410), and the mobile communication unit (MU) remains disabled, not allowing the user to receive the multimedia broadcast service provided by the wireless communication system (block 412).

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A wireless communication system, comprising:
    a network;
    one or more content sources adapted to generate multimedia data, wherein said one or more content sources are coupled to said network; one or more base stations adapted to wirelessly broadcast said multimedia data, wherein said one or more base stations are coupled to said network; and
    a provisioning device comprising a radio frequency identification (RFID) reader adapted to read an identifier from an RHD tag present in said mobile communication unit, wherein the provisioning device is adapted to compare said identifier to provisioning information to determine whether said mobile communication unit is provisioned to receive said broadcast multimedia data.

2. The wireless communication system of claim 1, wherein said provisioning information is stored in a local memory of said provisioning device.

3. The wireless communication system of claim 1, further comprising a local provisioning server containing provisioning information, wherein said local provisioning server is coupled to said network.

4. The wireless communication system of claim 3, wherein said provisioning device is adapted to:
    send a request to provision said mobile communication unit to said local provisioning server by way of said network, wherein said request includes said identifier; and
    receive a response to said request from said local provisioning server by way of said network, wherein said response indicates whether said mobile communication unit is provisioned to receive said broadcast multimedia data.

5. The wireless communication system of claim 1, further comprising an external network interface coupled to said network and an external network.

6. The wireless communication system of claim 5 wherein said provisioning device is adapted to:
    send a request to provision said mobile communication unit to an external provisioning server by way of said network, said external network interface, and said external network, wherein said request includes said identifier; and
    receive a response to said request from said external provisioning server by way of said external network, external network interface and network, wherein said response indicates whether said mobile communication unit is provisioned to receive said broadcast multimedia data.

7. The wireless communication system of claim 1, wherein said provisioning device is adapted to enable said mobile communication unit to receive said broadcast multimedia data.

8. The wireless communication system of claim 1, further comprising a content server coupled to said network, wherein said content server is adapted to:
    receive said multimedia data from said one or more content sources by way of said network;
    configure said multimedia data for transmission by way of a plurality of channels; and
    send said configured multimedia data to said one or more base stations by way of said network.

9. The wireless communication system of claim 1, further comprising an external network interface coupled to said network, wherein said external network interface is adapted to receive provisioning information from an external provisioning server by way of an external network.

10. The wireless communication system of claim 9, wherein said external network interface is adapted to send said provisioning information to said provisioning device by way of said network.

11. The wireless communication system of claim 9, wherein said external network interface is adapted to send said provisioning information to a local provisioning server by way of said network.

12. The wireless communication system of claim 1, wherein said system is located at or approximate an event venue.

13. The wireless communication system of claim 1, wherein said one or more content sources comprises a video camera, a still picture camera, a microphone, and/or a data storage device.

14. A method, comprising:
    reading an identifier, by a provisioning device, from a mobile communication unit, wherein said identifier is read from a radio frequency identification (RFID) tag of said mobile communication unit;
    determining whether said mobile communication unit is provisioned to receive broadcast multimedia data by comparing said identifier to provisioning information; and
    enabling said mobile communication unit to receive said multimedia data, by said provisioning device, if it is determined that said mobile communication unit is provisioned to receive said broadcast multimedia data.

15. The method of claim 14 wherein determining whether said mobile communication unit is provisioned comprises accessing said provisioning information stored in a local database.

16. The method of claim 14 wherein determining whether said mobile communication unit is provisioned comprises:
   sending said identifier to a provisioning server; and
   receiving information as to whether said mobile communication unit is provisioned to receive said broadcast multimedia data from said provisioning server.

17. The method of claim 14 further comprising broadcasting said multimedia data.

18. The method of claim 17 wherein said multimedia data is broadcasted on a plurality of channels.

19. The method of claim 14 further comprising receiving payment for a purchase or rental of said mobile communication unit.

20. The method of claim 14 further comprising receiving payment for said mobile communication unit (MU) to be provisioned to receive said broadcast multimedia data.

* * * * *